United States Patent
Kim et al.

(10) Patent No.: US 7,349,051 B2
(45) Date of Patent: Mar. 25, 2008

(54) IN PLANE SWITCHING MODE LIQUID CRYSTAL DISPLAY DEVICE HAVING PARTICULAR COMMON LINES

(75) Inventors: Do-Sung Kim, Gycongsangbuk-Do (KR); Byung-Koo Kang, Gycongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/819,127

(22) Filed: Jun. 25, 2007

(65) Prior Publication Data
US 2007/0252939 A1 Nov. 1, 2007

Related U.S. Application Data

(62) Division of application No. 10/975,392, filed on Oct. 29, 2004, now Pat. No. 7,251,004.

(30) Foreign Application Priority Data
Nov. 11, 2003 (KR) ............... 10-2003-0079550

(51) Int. Cl.
*G02F 1/1343* (2006.01)
(52) U.S. Cl. ............... 349/141; 349/38; 349/39
(58) Field of Classification Search ............... 349/141, 349/38, 39
See application file for complete search history.

(56) References Cited

U.S. PATENT DOCUMENTS 5,852,485 A * 12/1998 Shimada et al. ............ 349/141
6,281,958 B1 * 8/2001 Nakajima ............... 349/141
6,642,984 B1 * 11/2003 Yoshida et al. ............ 349/139

FOREIGN PATENT DOCUMENTS

JP 9-258269 10/1997
JP 11-125835 5/1999

OTHER PUBLICATIONS

Communication for Korean Patent Office dated Apr. 27, 2006.

* cited by examiner

*Primary Examiner*—Mike Qi
(74) *Attorney, Agent, or Firm*—McKenna Long & Aldridge LLP

(57) ABSTRACT

An in-plane switching mode liquid crystal display device includes first and second substrates; a gate line and a data line arranged in a substantially horizontal and vertical direction, respectively, on the first substrate to define a pixel region; a switching device formed at a crossing of the gate line and the data line; a common line formed substantially parallel to the data line at a center of the pixel region; a pixel electrode line overlapping the common line; a plurality of common electrodes extended from the common line; pixel electrodes extended from the pixel electrode line, disposed substantially parallel to the common electrodes, wherein a lateral electric field is formed between the common electrodes and the pixel electrodes; and a liquid crystal layer formed between the first substrate and the second substrate.

4 Claims, 8 Drawing Sheets

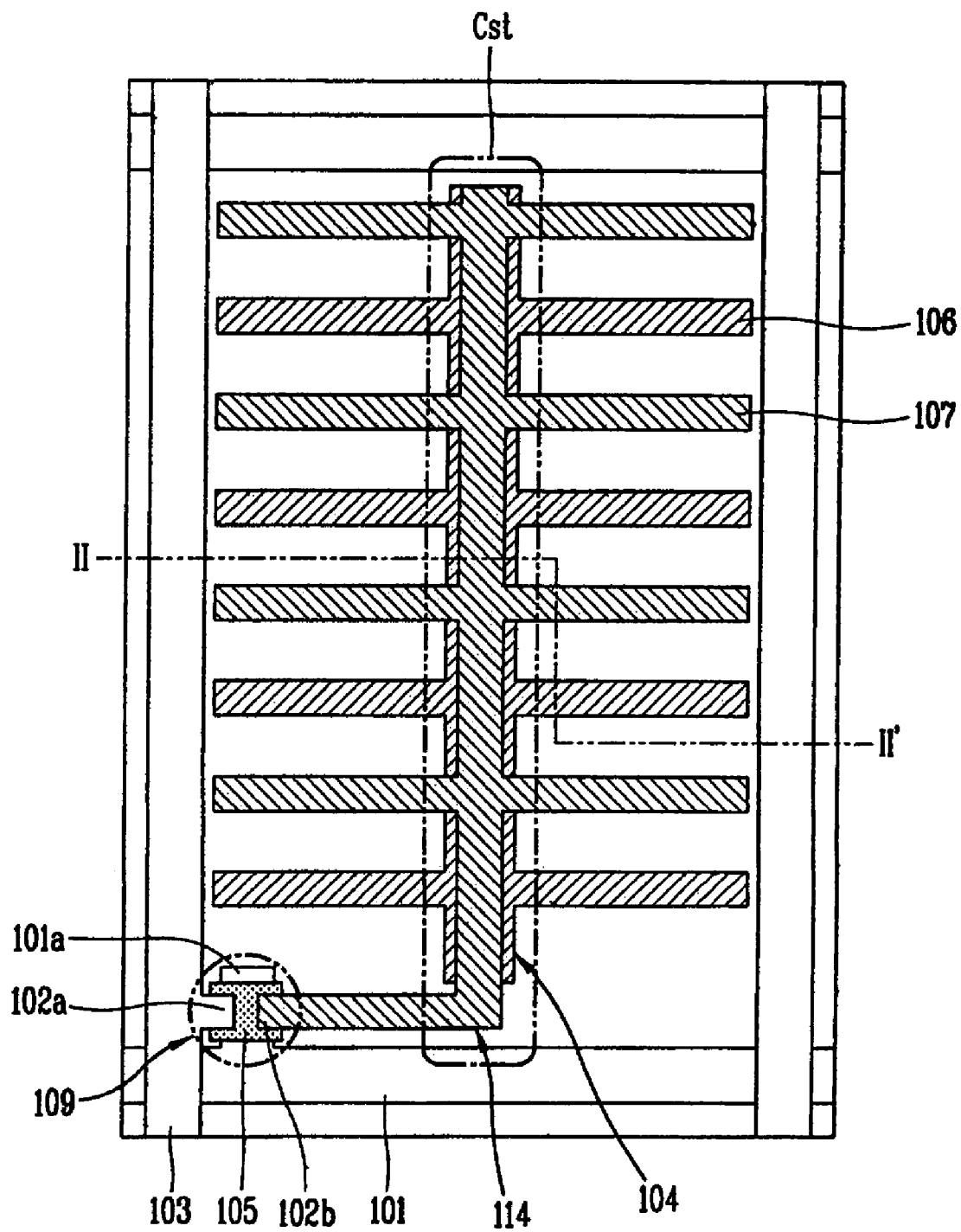

IN PLANE SWITCHING MODE LIQUID CRYSTAL DISPLAY DEVICE HAVING PARTICULAR COMMON LINES

This application is a divisional of application Ser. No. 10/975,392, filed Oct. 29, 2004, now U.S. Pat. No. 7,251,004, which claims priority to Korean Patent Application No. 10-2003-0079550, filed Nov. 11, 2003, each of which are incorporated by reference for all purposes as if fully set forth herein.

BACKGROUND OF THE INVENTION

1. Field of the Invention

The present invention relates to an in plane switching mode liquid crystal display device, and particularly, to an in plane switching mode liquid crystal display device and fabrication method of improving an aperture ratio.

2. Description of the Related Art

Liquid crystal display devices have been typically used because they consume low power and provide a high picture quality. A liquid crystal display device is formed by attaching a thin film transistor array substrate and a color filter substrate face to face with a uniform interval therebetween, and placing a liquid crystal layer between the thin film transistor array substrate and the color filter substrate.

Pixels are arranged on the thin film transistor array substrate in a matrix. A thin film transistor, a pixel electrode and a capacitor are formed within a pixel. A common electrode, an RGB color filter and a black matrix are formed on the color filter substrate. The common electrode applies an electric field to the liquid crystal layer together with the pixel electrode. The RGB color filter provides color display capabilities. An alignment film is formed at facing surfaces of the thin film transistor array substrate and the color filter substrate and is rubbed to orient the liquid crystal layer in a specified direction.

When an electric field is applied between the pixel electrode and the common electrodes, the liquid crystal rotates due to a dielectric anisotropy. As a result, light is transmitted or blocked by pixels to display a character or an image. However, such a twisted nematic mode liquid crystal display device has a narrow viewing angle. In-plane switching mode LCD arrangements have been introduced to improve the narrow viewing angle by aligning liquid crystal molecules in a substantially horizontal direction with respect to the substrate.

FIG. 1A depicts a plan view of an in-plane switching mode liquid crystal display (LCD) device in accordance with a related art arrangement. FIG. 1B illustrates a sectional view of an in-plane switching mode liquid crystal display (LCD) device in accordance with a related art arrangement. As shown in FIG. 1A, gate lines 1 and data lines 3 are arranged horizontally and vertically, respectively, on a first transparent substrate 10, defining pixel regions. Although in an actual liquid crystal display device, the 'N' number of gate lines 1 and the 'M' number of data lines 3 cross each other to create an N×M number of pixels. Only one pixel is shown in FIG. 1A for explanatory purposes.

A thin film transistor 9 is disposed at a crossing of the gate line 1 and the data line 3. The thin film transistor 9 includes a gate electrode 1a, a semiconductor layer 5 and source/drain electrodes 2a and 2b. The gate electrode 1a is connected to the gate line 1. The source/drain electrodes 2a and 2b are connected to the data line 3. A gate insulation layer 8 is formed on the entire substrate.

A common line 4 is arranged parallel to the gate line 1 in the pixel region. A pair of electrodes, which are a common electrode 6 and a pixel electrode 7, are arranged parallel to the data line 3 for switching liquid crystal molecules. The common electrode 6 is simultaneously formed with the gate line 1 and connected to the common line 4. The pixel electrode 7 is simultaneously formed with the source/drain electrodes 2a and 2b and connected to the drain electrode 2b of the thin film transistor 9. A passivation film 11 is formed on the entire surface of the substrate 10 including the source/drain electrodes 2a and 2b. A pixel electrode line 14 is formed to overlap the common line 4 and is connected to the pixel electrode 7. The pixel electrode line 14, the common line 4, and the gate insulation layer 8 interposed therebetween, form a storage capacitor (Cst).

A black matrix 21 and a color filter 23 are formed on a second substrate 20, on which an overcoat film is formed for flattening the color filter 23. The black matrix 21 prevents light leakage to the thin film transistor 9, the gate line 1 and the data line 3. The color filter 23 provides color display capabilities to the liquid crystal display device. Alignment films 12a and 12b are formed at facing surfaces of the first and second substrates 10 and 20. The alignment films 12a and 12b determine an initial alignment direction of the liquid crystal. A liquid crystal layer 13 is formed between the first and second substrates 10 and 20. The light transmittance of the liquid crystal layer 13 is controlled by a voltage applied between the common electrode 6 and the pixel electrode 7.

The in-plane switching mode LCD device having such a structure as described above with respect to the related art can advantageously improve a viewing angle because the common electrode 6a and 6b and the pixel electrode 7 are disposed on the same plane.

However, the in-plane switching mode LCD device is disadvantageous in that an aperture ratio is degraded because the common electrode 6 and the pixel electrode 7 are disposed in a pixel region where an image is displayed, which results in deterioration of brightness.

In addition, a lateral electric field is not normally formed in the pixel because of signal interference between the data line 3 and the pixel electrode 7. In order to solve such signal interference, a common line 6b is disposed at a region adjacent to the data line 3. The common electrode 6 disposed at an outer edge of the pixel acts as a shielding line for shielding a data signal and is formed to be wider than the common electrode 6 positioned at a central portion of the pixel, thereby reducing the aperture ratio.

SUMMARY OF THE INVENTION

Accordingly, the present invention is directed to an in-plane switching mode liquid crystal display device and fabrication method that substantially obviates one or more of the problems due to limitations and disadvantages of the related art.

An advantage of the present invention is to provide an in-plane switching mode liquid crystal display device and its fabrication method capable of removing a shielding line disposed at an outer edge of a data line by placing a pixel electrode as far as possible from a data line and of improving an aperture ratio by enlarging a pixel region in a region adjacent to the data line.

To achieve these and other advantages and in accordance with the purpose of the present invention, as embodied and broadly described herein, there is provided an in-plane switching mode liquid crystal display device includes first and second substrates; a gate line and a data line arranged horizontally and vertically on the first substrate to define a pixel region; a switching device formed at a crossing of the gate line and the data line; a common line formed substantially parallel to the data line at a center of the pixel region; a pixel electrode line overlapping the common line; a plurality of common electrodes extended from the common line; pixel electrodes extended from the pixel electrode line, disposed substantially parallel to the common electrodes and forming a lateral electric field within the pixel region together with the common electrodes; and a liquid crystal layer formed between the first substrate and the second substrate.

Another advantage of the present invention provides an in-plane switching mode liquid crystal display device includes first and second substrates; a gate line and a data line arranged horizontally and vertically on the first substrate to define a pixel region; a thin film transistor formed at a crossing of the gate line and the data line; a common line disposed substantially parallel to the data line at a center of the pixel; a pixel electrode line overlapping with the common line and forming a storage capacitor; common electrodes electrically connected to the common line, having a bent structure and being symmetric on the basis of the common line; a pixel electrode electrically connected to the pixel electrode line, disposed parallel to the common electrode and forming a lateral electric field together with the common electrode; a shielding line disposed substantially parallel to the data line at both outer edges of the pixel, and shielding a data signal reaching the pixel electrode and the pixel electrode line; and a liquid crystal layer formed between the first substrate and the second substrate.

In another embodiment of the present invention, a fabrication method of an in-plane switching mode liquid crystal display device include, providing first and second substrates; forming a gate line, a common line and a common electrode on the first substrate, wherein the common electrode is extended from the common line and is symmetric with respect to the common line; forming a data line crossing the gate line to define a pixel region, a pixel electrode line disposed substantially parallel to the data line at the center of the pixel region and overlapping the common line to form a storage capacitor, and a pixel electrode forming a lateral electric field with the common electrode; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B illustrate an in-plane switching mode liquid crystal display device according to a first embodiment of the present invention;

DETAILED DESCRIPTION OF THE ILLUSTRATED EMBODIMENTS

Reference will now be made in detail to the embodiments of the present invention, examples of which are illustrated in the accompanying drawings.

Figure 1A:
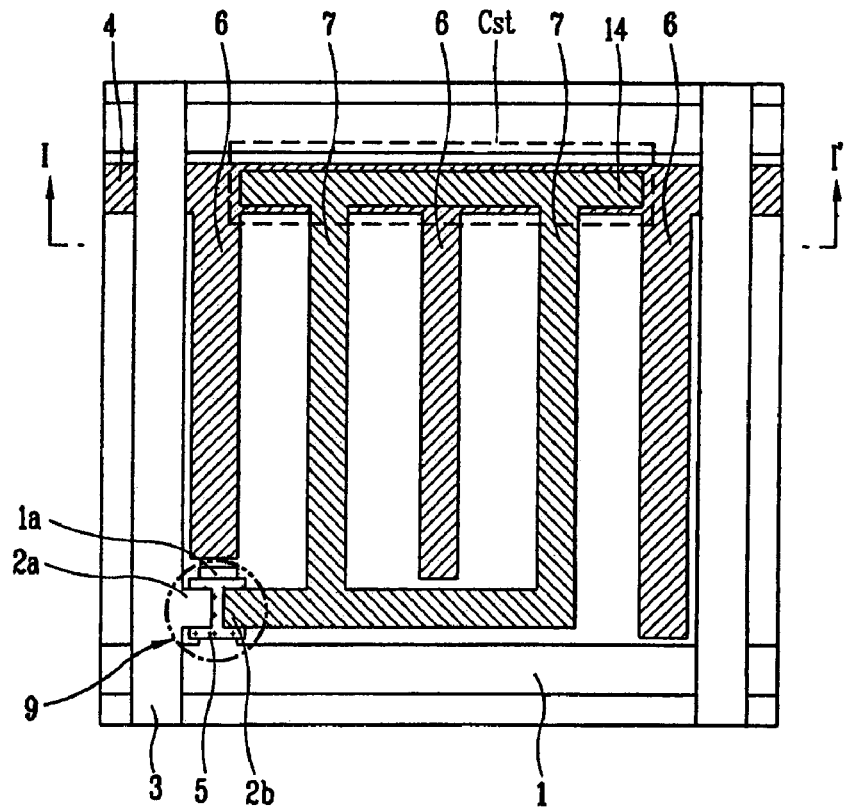
FIGS. 1A and 1B illustrate a related art in-plane switching mode liquid crystal display device.
Figure 1B:
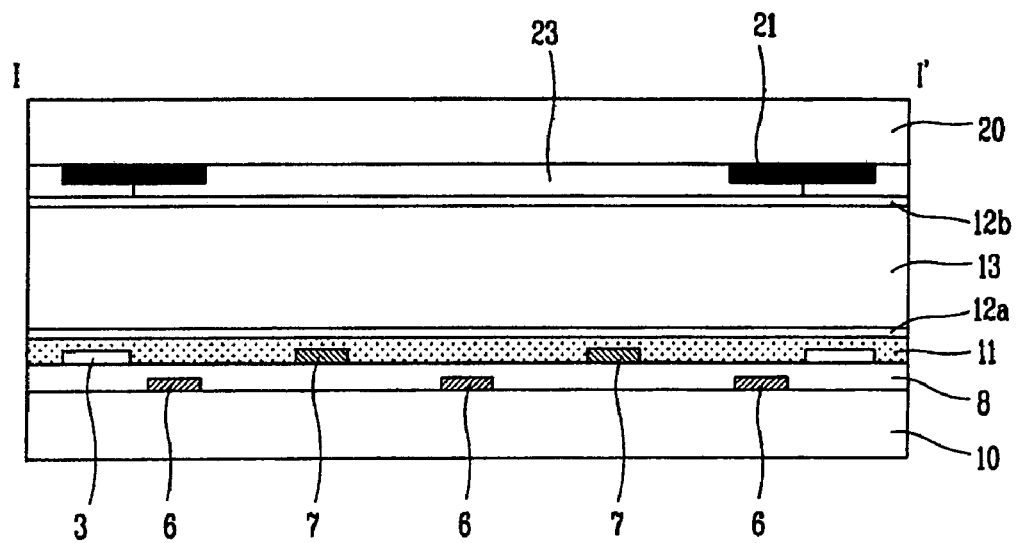
Figure 2B:
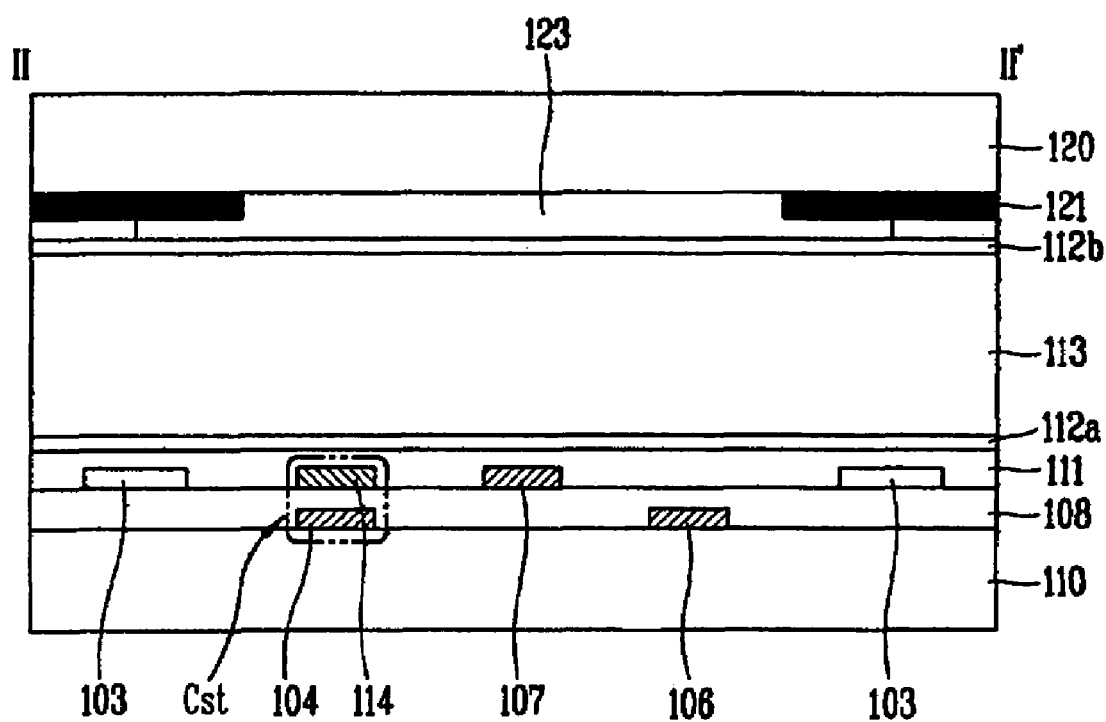

FIGS. 2A and 2B illustrate an in-plane switching mode LCD device according to the present invention. Specifically, FIG. 2A is a plan view, and FIG. 2B is a sectional view taken along line II-II' of FIG. 2A.

As shown, in the in-plane switching mode LCD device according to the present invention, a gate line 101 and a data line 103 are horizontally and vertically arranged on a transparent first substrate 110 to define a pixel region. A switching device 109 is disposed at a crossing of the gate line 101 and the data line 103. The switching device 109 includes a gate electrode 101a extended from the gate line 101, a semiconductor layer 105 formed on the gate electrode 101a and source/drain electrodes 102a and 102b, respectively, disposed with a certain interval therebetween on the semiconductor layer 105.

Additionally, at least one pair of a common electrode 106 and a pixel electrode 107 which generate a lateral electric field are formed substantially parallel to the gate line 101 in the pixel. The common electrode 106 is electrically connected to a common line 104 which is disposed substantially parallel to a data line 103 at a central portion of the pixel, and the pixel electrode 107 is electrically connected to a pixel electrode line 114 overlapping the common line 104 to form a storage capacitor (Cst).

As shown in FIG. 2B, the common electrode 106 and the pixel electrode 107 are electrically insulated by a gate insulation film 108 interposed therebetween, and the common line 104 and the pixel electrode line 114 form a storage capacitor with the gate insulation film 108 therebetween. A passivation film 111 is applied on an entire surface of the first substrate 110 including the data line 103 and the pixel electrode 107.

Meanwhile, a black matrix 121 for preventing leakage of light and a color filter 123 for implementing color are formed on the second substrate 120. First and second alignment films 112a and 112b which determine an initial alignment direction of liquid crystal are applied at facing surfaces of the first substrate 110 and the second substrate 120, and a liquid crystal layer 113 is formed therebetween.

In the in-plane switching mode LCD device constructed as above according to the present invention, the common line 104 and the pixel electrode line 114 are disposed at the center of the pixel, and the common electrode 106 and the pixel electrode 107 which generate an electric field to drive liquid crystals are disposed substantially parallel to the gate line 101, thereby reducing signal interference of the data line 103. Specifically, because the pixel electrode line 114 is disposed at the center of the pixel and the pixel electrode 107 extends in a substantially perpendicular direction from the pixel electrode line 114, a distance between the pixel electrode 107 and the data line 103 is lengthened, thereby minimizing signal interference.

Because the storage capacitor (Cst) is formed by the common line 104 and the pixel electrode line 114 disposed at the center of the pixel, an area occupied by the related art storage electrode can be a part of an aperture region. Also, in the present invention, because a special shielding line for shielding a data signal may be omitted, the aperture region may be extended to a region near the data line.

Because the common line and the pixel electrode line are disposed substantially parallel to the data line, a storage capacitor formed by overlapping of the common line and the pixel electrode line is increased. Generally, because a vertical length of the pixel is longer than its horizontal length, if the common electrode and the pixel electrode are disposed in a vertical direction (data line direction) and overlap with each other, a storage capacitor may be increased in comparison with a structure in which the common line and the pixel line are disposed in a horizontal direction, i.e., substantially parallel to the gate line.

The common electrode 106 and the pixel electrode 107 are symmetric with respect to the common line 104 and the pixel electrode line 114 disposed at the center of the pixel. The common electrode 106 and the pixel electrode 107 may have a "-" shaped straight-line structure substantially parallel to the gate line 101, or may have a bent structure with a "Λ" or "V" shape.

Figure 3:
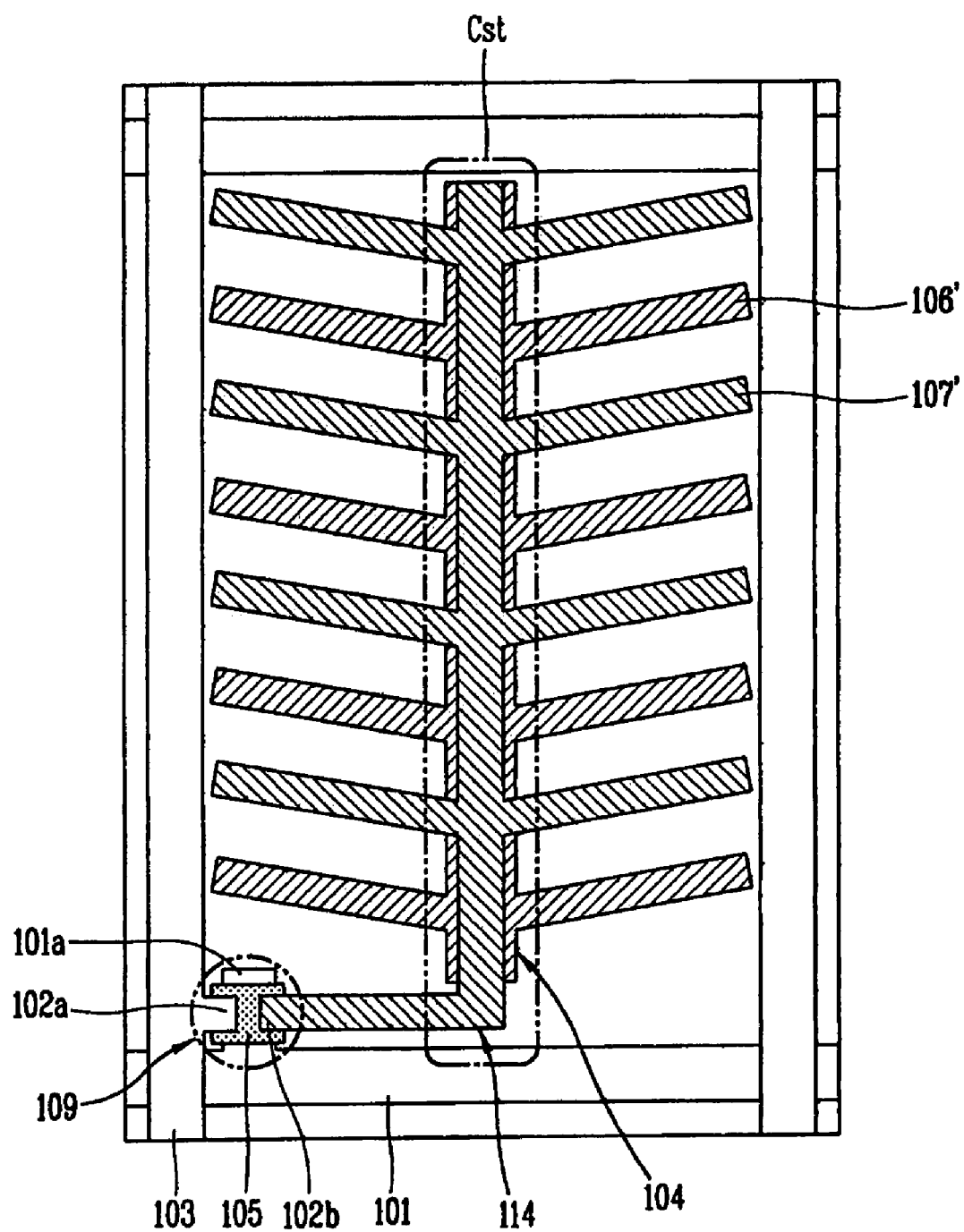
FIG. 3 illustrates a second embodiment of the present invention.
Figure 4:
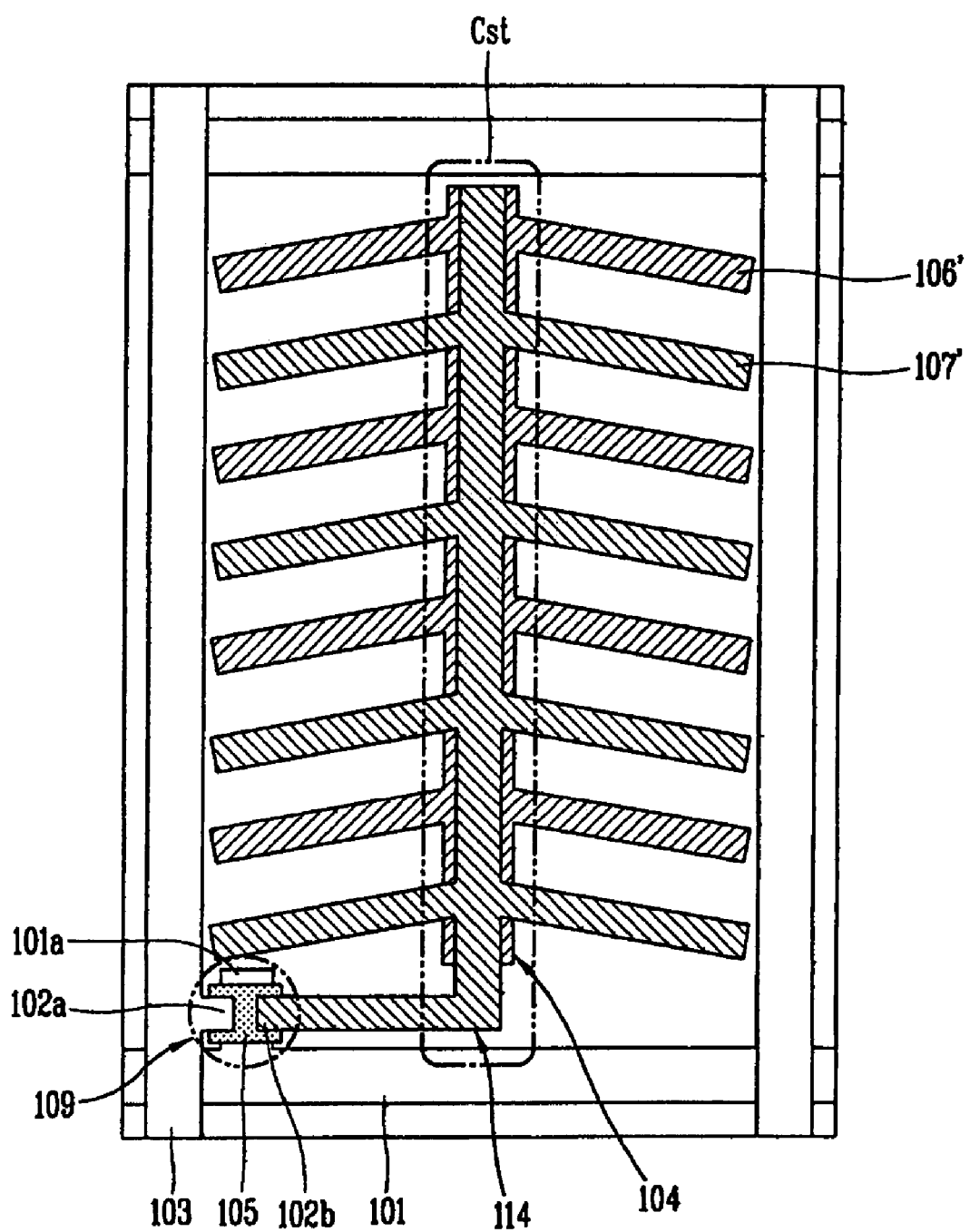
FIG. 4 illustrates a third embodiment of the present invention.

FIGS. 3 and 4 illustrate additional embodiments of the present invention, in which a common electrode and a pixel electrode have a bent structure. Specifically, FIG. 3 illustrates an LCD device in which a common electrode and a pixel electrode have a bent structure with a "V" shape, and FIG. 4 illustrates an LCD device in which a common electrode and a pixel electrode have a bent structure with a "Λ" shape.

As shown in FIGS. 3 and 4, the common electrode 106' and the pixel electrode 107' are not parallel to the gate line 101, but are bent at a predetermined angle based on the common line 104 and the pixel electrode line 114. The bending of the common and pixel electrodes 106' and 107' may be made in an angled direction having a range of $+/-0° \geq \theta \leq 90°$ with respect to the pixel region.

In the LCD device as described above, in which the pixel electrode 107' and the common electrode 106' have a bent structure with respect to the common line 104, and the pixel electrode line 114 is disposed at the center of the pixel, a multi-domain having symmetrical driving directions for liquid crystals within one pixel is formed. Accordingly, abnormal light due to a birefringence characteristic of the liquid crystal is offset, and color shifting is minimized. The gate line 101 may also have a bent structure similar to the common electrode 106' and the pixel electrode 107'.

In addition, by forming a shielding line adjacent to the data line 103 at an outer edge of the pixel, signal interference of the data line 103 may be effectively shielded.

Figure 5:
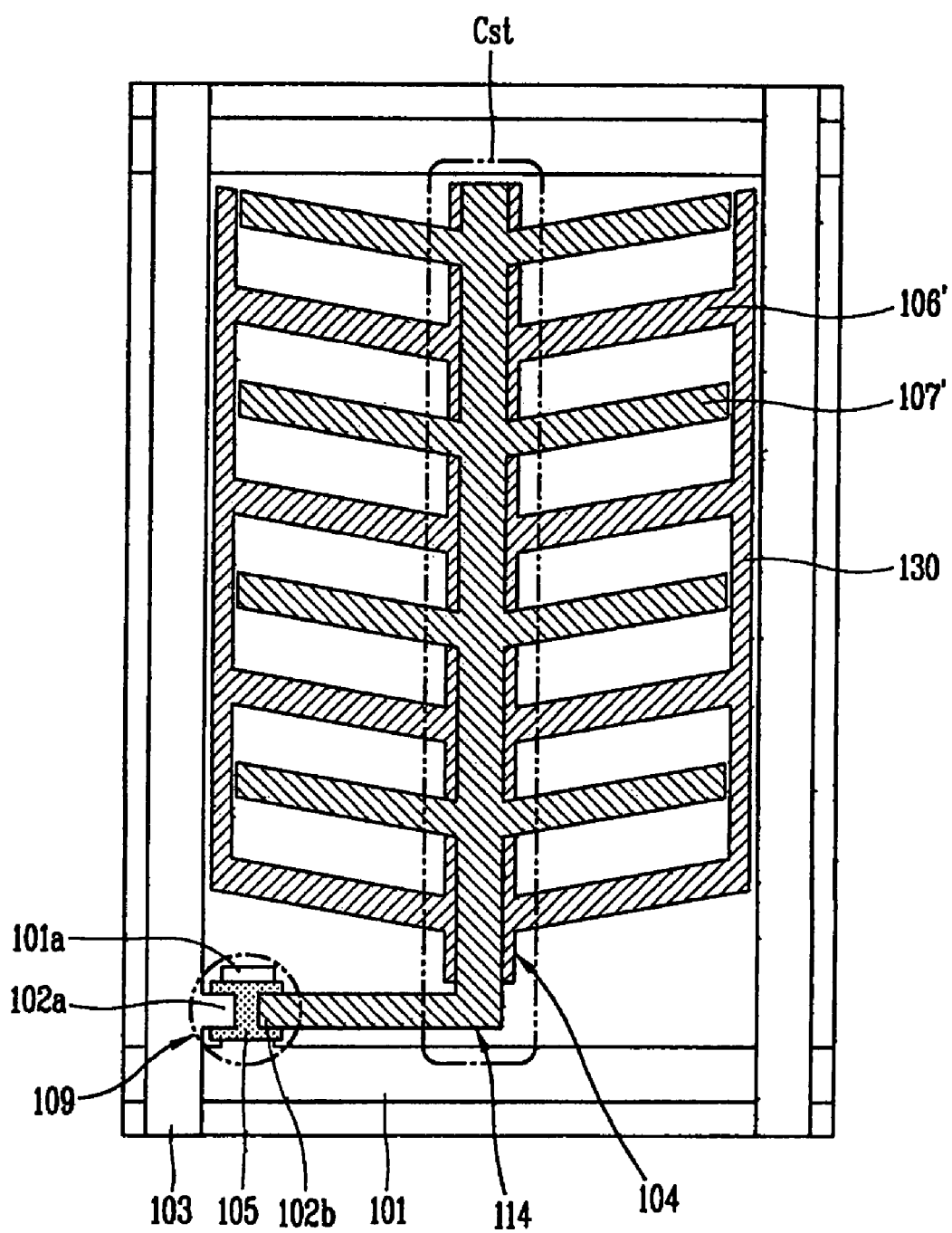
FIG. 5 illustrates a fourth embodiment of the present invention.

FIG. 5 illustrates another embodiment of the present invention in which a data signal shielding line is constructed. A shielding line 130 is formed substantially parallel and adjacent to the data line 103, and electrically connected to the common electrode 106'. The shielding line 130 shields signal interference between the data line 103 and the pixel electrode 107'. In the related art, a common electrode next to a data line has a wider width to function as a shielding line. However, the shielding line 130 according to the present invention can effectively shield a signal of the data line 103 with a width smaller than the related art common electrode.

A fabrication method of an in-plane switching mode LCD device according to the present invention will now be explained.

Figure 6A:
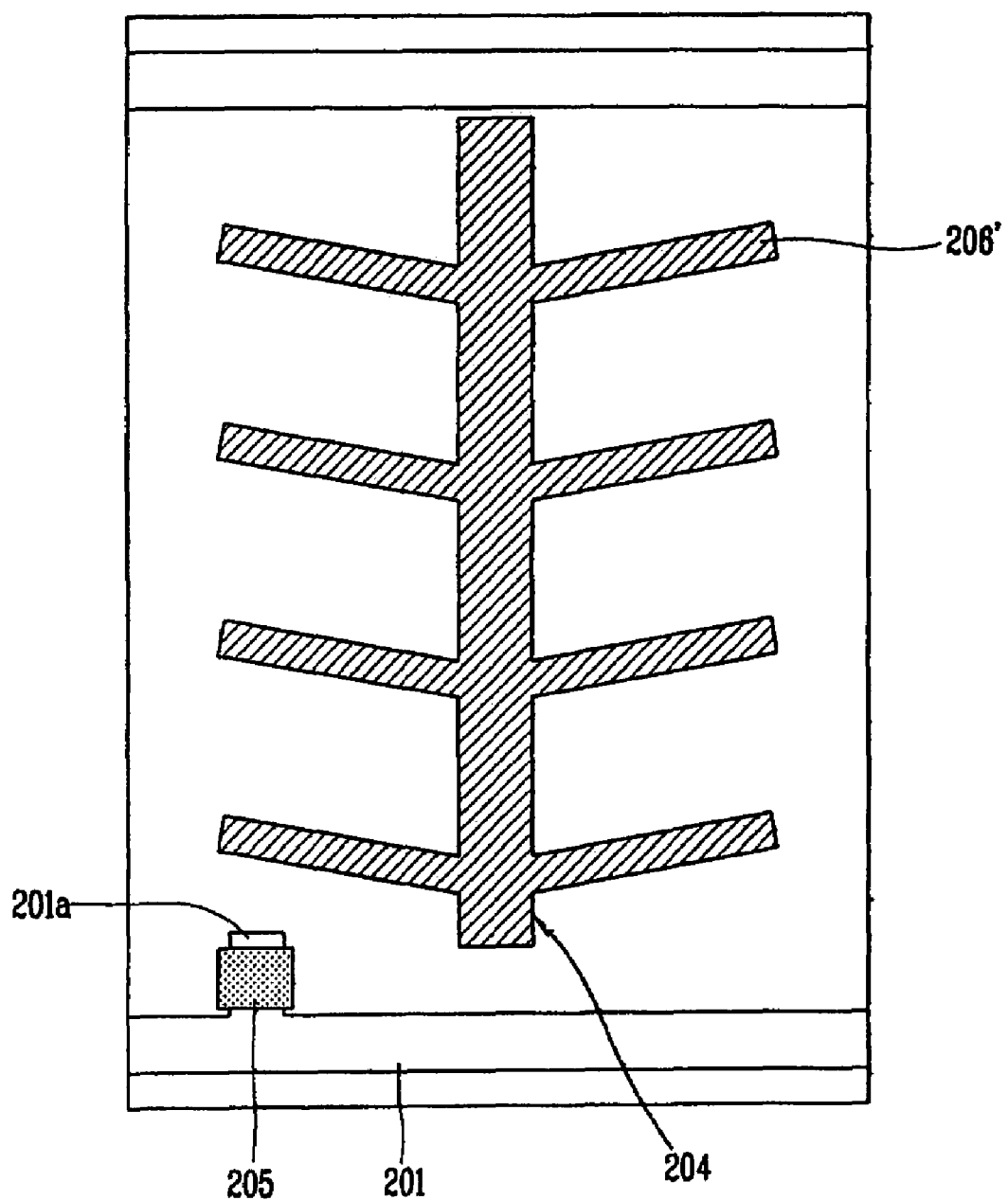
FIGS. 6A and 6B are sectional views of a fabrication method of an in-plane switching mode liquid crystal display device according to the present invention.
Figure 6B:
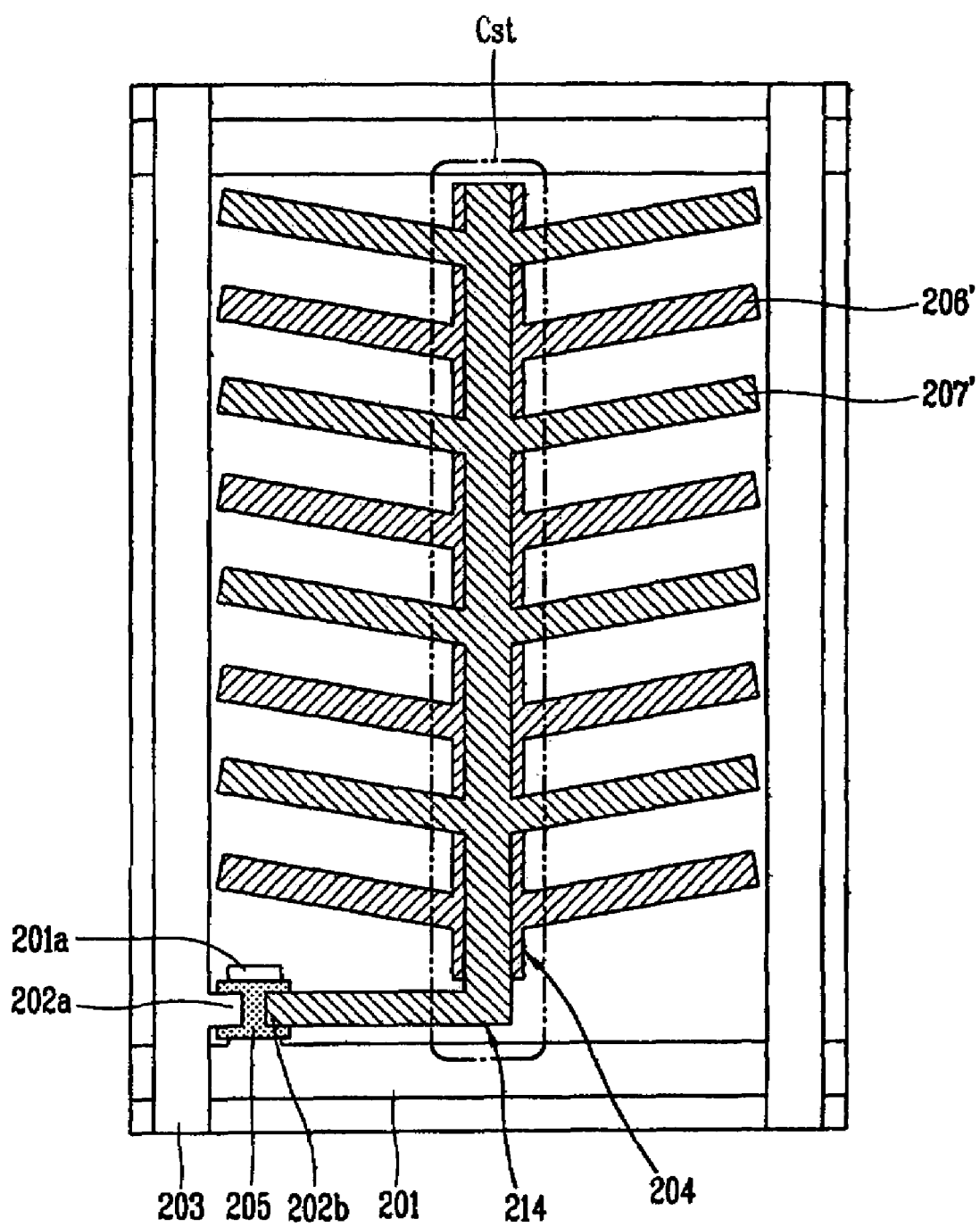

FIGS. 6A and 6B are plan views illustrating a fabrication process of an in-plane switching mode LCD device according to the present invention.

In FIG. 6A, a transparent first substrate is prepared, then, a first metallic material such as Cu, Ti, Cr, Al, Mo, Ta, Al alloy is deposited thereon and patterned, thereby forming a gate line 201, a gate electrode 201a, a common line 204 disposed substantially perpendicular to the gate line 201 and a plurality of common electrodes 206' that are electrically connected to the common line 204. The common electrode 206' is symmetrical with respect to the common line 204 and may have a "-" shaped straight line structure or a bent structure with a "V" or "Λ" shape, wherein the bent structure is in an angled direction having a range of $+/-0° \geq \theta \leq 90°$ with respect to the pixel region.

Next, SiNx, SiOx or the like is deposited on an entire surface of the substrate including the gate line 201 and the common line 204 using a plasma CVD method, thereby forming a gate insulation film (not shown). Then, an amorphous silicon and $n^+$ amorphous are stacked on the gate insulation film (not shown) and patterned, to form a semiconductor layer 205 on the gate line 201.

Then, as shown in FIG. 6B, a second metallic material such as Cu, Mo, Ta, Al, Cr, Ti, Al alloy is deposited on the semiconductor layer 205 and the gate insulation film (not shown) and patterned, thereby forming a data line 203 disposed substantially perpendicular to the gate line 201 and defines a pixel region with the gate line 201; source/drain electrodes 202a/202b on the semiconductor layer 205; a pixel electrode line 214 disposed substantially parallel to the data line 203; a storage capacitor (Cst) that overlaps the common line 204; and a pixel electrode 207'. A lateral electric field is generated between the pixel electrode 207' and the common electrode 206.

The pixel electrode 207 may have a "-" formed straight line structure, or may have a bent structure with a "V" or "Λ" shape (wherein the bent structure is an angled direction having a range of $+/-0° \geq \theta \leq 90°$ with respect to the pixel region), and should have the same structure as of the common electrode 206.

Thereafter, an inorganic material such as SiNx or SiOx or an organic material such as benzocyclobutene (BCB) or acryl is applied on the substrate on which a thin film transistor 209 is formed, thereby forming a passivation film (not shown).

Next, the first substrate is attached to a second substrate on which a color filter is formed, thereby completing a panel of an LCD device.

The common electrode 206' or the pixel electrode 207' may be formed on the passivation film, and one of the two electrodes may be formed of a transparent conductive material such as ITO (indium tin oxide) or IZO (indium zinc oxide). If the common electrode 206' or the pixel electrode 207' is made of a transparent material, brightness may improve.

As so far described, in the present invention, the common line and the pixel electrode line are disposed parallel to the data line at the center of the pixel, and the common electrode and the pixel electrode are disposed parallel to the gate line, thereby reducing signal interference of a data line. Accordingly, image quality and an aperture ratio may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:

first and second substrates;

a gate line and a data line arranged in a substantially horizontal and vertical direction, respectively, on the first substrate to define a pixel region;

a thin film transistor formed at a crossing of the gate line and the data line;

a common line disposed substantially parallel to the data line at a center of the pixel region;

a pixel electrode line overlapping the common line and forming a storage capacitor;

a common electrode electrically connected to the common line, having a bent structure and being symmetric with respect to the common line;

a pixel electrode electrically connected to the pixel electrode line, disposed substantially parallel to the common electrode, wherein a lateral electric field is formed between the common electrode and the pixel electrode;

a shielding line disposed substantially parallel to the data line at outer edges of the pixel region, and shielding a data signal reaching the pixel electrode; and a liquid crystal layer formed between the first substrate and the second substrate.

2. The device of claim 1, wherein the pixel electrode line is disposed at the center of the pixel region.

3. The device of claim 1, wherein the pixel electrode has a bent structure having a "Λ" or "V" shape.

4. The device of claim 1, wherein the shielding line is electrically connected to the common electrode.

* * * * *